(12) United States Patent
Stauber

(10) Patent No.: US 9,829,340 B2
(45) Date of Patent: Nov. 28, 2017

(54) ANALYSIS OF INTERACTIVE MAP USAGE PATTERNS

(75) Inventor: Itzik Stauber, Ra'annana (IL)

(73) Assignee: GOOGLE INC., Mountain View, CA (US)

( * ) Notice: Subject to any disclaimer, the term of this patent is extended or adjusted under 35 U.S.C. 154(b) by 358 days.

(21) Appl. No.: 12/949,543

(22) Filed: Nov. 18, 2010

(65) Prior Publication Data

US 2015/0211881 A1    Jul. 30, 2015

(51) Int. Cl.
G01C 21/36 (2006.01)
G01C 21/34 (2006.01)

(52) U.S. Cl.
CPC ..... *G01C 21/3682* (2013.01); *G01C 21/3484* (2013.01)

(58) Field of Classification Search
CPC ................. G06F 17/30241; G06F 17/3087
USPC .......................................................... 715/771
See application file for complete search history.

(56) References Cited

U.S. PATENT DOCUMENTS

| | | | |
|---|---|---|---|
| 5,583,763 A * | 12/1996 | Atcheson et al. | 707/750 |
| 7,616,217 B2 | 11/2009 | Dayan | |
| 7,890,254 B2 | 2/2011 | Arnold-huyser et al. | |
| 7,899,615 B2 | 3/2011 | Arnold-huyser et al. | |
| 8,014,939 B2 | 9/2011 | Sheha et al. | |
| 8,115,764 B2 | 2/2012 | Kameda et al. | |
| 8,135,505 B2 | 3/2012 | Vengroff et al. | |
| 8,239,130 B1 * | 8/2012 | Upstill et al. | 701/426 |
| 2006/0010029 A1 * | 1/2006 | Gross | 705/10 |
| 2007/0143345 A1 * | 6/2007 | Jones | G06F 17/30241 |
| 2007/0171046 A1 * | 7/2007 | Diem | G06Q 10/00 340/539.13 |
| 2008/0051994 A1 * | 2/2008 | Fisher et al. | 701/210 |
| 2008/0086264 A1 * | 4/2008 | Fisher | G01C 21/30 701/533 |
| 2008/0086686 A1 * | 4/2008 | Jing et al. | 715/706 |
| 2008/0091525 A1 * | 4/2008 | Kretz | 705/14 |
| 2009/0005987 A1 * | 1/2009 | Vengroff et al. | 701/300 |
| 2009/0176509 A1 * | 7/2009 | Davis et al. | 455/456.3 |
| 2009/0313113 A1 * | 12/2009 | Dye et al. | 705/14.42 |
| 2010/0153175 A1 * | 6/2010 | Pearson et al. | 705/10 |
| 2010/0211909 A1 * | 8/2010 | Ghanekar | G06F 17/30241 715/788 |

(Continued)

*Primary Examiner* — Kevin L Young
*Assistant Examiner* — Haimei Jiang
(74) *Attorney, Agent, or Firm* — Marshall, Gerstein & Borun LLP

(57) ABSTRACT

Methods, systems, and apparatus, including computer programs encoded on a computer storage medium, for analyzing user interactions with an electronic map. In one aspect, a plurality of records is identified, the records each identifying at least one map segment in a plurality of map segments included in an interactive electronic map. The records can further include map usage data corresponding to the respective map segment identified in the record, the map usage data corresponding to at least one property of at least one presentation of the map segment to a user. Each map segment in the plurality of map segments is scored. Scoring each map segment includes evaluating map usage data corresponding to the map segment against at least one criteria, the criteria adapted to predict a level of user interest in the map segment based on at least one property of at least one presentation of the map segment.

18 Claims, 9 Drawing Sheets
(5 of 9 Drawing Sheet(s) Filed in Color)

(56) References Cited

U.S. PATENT DOCUMENTS

| | | | |
|---|---|---|---|
| 2010/0262658 A1* | 10/2010 | Mesnage | 709/204 |
| 2010/0293035 A1* | 11/2010 | Athsani et al. | 705/10 |
| 2011/0041080 A1* | 2/2011 | Fleischman et al. | 715/751 |
| 2011/0087966 A1* | 4/2011 | Leviathan | 715/745 |
| 2011/0093188 A1* | 4/2011 | Barkai et al. | 701/200 |
| 2011/0145228 A1* | 6/2011 | Laurenzo et al. | 707/723 |
| 2011/0173198 A1* | 7/2011 | Malleshaiah et al. | 707/737 |
| 2011/0270833 A1* | 11/2011 | von Kaenel et al. | 707/736 |
| 2011/0276568 A1* | 11/2011 | Fotev | 707/728 |
| 2012/0010995 A1* | 1/2012 | Skirpa et al. | 705/14.49 |
| 2012/0047143 A1* | 2/2012 | Petersen et al. | 707/738 |
| 2012/0110071 A1* | 5/2012 | Zhou et al. | 709/204 |
| 2012/0135746 A1* | 5/2012 | Mohlig et al. | 455/456.1 |
| 2012/0158492 A1* | 6/2012 | Ye et al. | 705/14.49 |

\* cited by examiner

|     | MID | 385 UID | 365 Duration | 375 Zoom Level | 380 View Type | 370 Timestamp | 382 Score |
|---|---|---|---|---|---|---|---|
| 360 { | 301 | 00101 | 4.5 | 5 | Map | 3/27 3:51 PM | 3 |
|     | 304 | 00101 | 4.5 | 5 | Map | 3/27 3:51 PM | 3 |
|     | 307 | 00101 | 4.5 | 5 | Map | 3/27 3:51 PM | 3 |
|     | 321 | 00101 | 0.5 | 5 | Map | 3/27 3:51 PM | 1 |
|     | 331 | 00101 | 0.6 | 5 | Map | 3/27 3:51 PM | 1 |
|     | 341 | 00101 | 2.1 | 5 | Map | 3/27 3:51 PM | 2 |
| 361 { | 304 | 00101 | 165.4 | 9 | Map | 3/27 3:55 PM | 9 |
|     | 307 | 00101 | 165.4 | 9 | Map | 3/27 3:55 PM | 9 |
|     | ... | ... | ... | ... | ... | ... | ... |
| 383 | 304 | 00102 | 221.2 | 8 | Satellite | 3/21 11:25 AM | 10 |
|     | 307 | 00102 | 221.2 | 8 | Satellite | 3/21 11:25 AM | 10 |
|     | ... | ... | ... | ... | ... | ... | ... |
| 384 | 301 | 00103 | 45.7 | 7 | Traffic | 11/2 6:15 PM | 7 |
|     | 304 | 00103 | 45.7 | 7 | Traffic | 11/2 6:15 PM | 7 |
|     | 307 | 00103 | 45.7 | 7 | Traffic | 11/2 6:15 PM | 7 |

FIG. 3D

ANALYSIS OF INTERACTIVE MAP USAGE PATTERNS

BACKGROUND

This specification relates to interactive electronic maps.

Interactive electronic maps can allow users to view, on a computer, maps and images of geographic areas and to navigate between different locations. In some electronic maps, a user interface can allow a user to pan or zoom on a particular view of the electronic map. Given the expansion of the Internet and computing power generally, numerous map engines have been developed allowing electronic maps to be linked to or integrated in thousands of business and personal websites. Electronic maps can be as simple as street maps for cities and other geographic areas. Some more recent Internet-based services allow people to view more detailed maps that include, for example, satellite imagery, topographical data, and 3-D representations of buildings and other structures. Electronic maps can also be returned as search results responsive to a query of a search engine. As the number of applications, websites, and services that utilize electronic maps increase, so do the number of users accessing and interacting with electronic maps, including electronic map services served over the Internet.

SUMMARY

This specification describes technologies relating to analyzing usage of an electronic map.

In general, one innovative aspect of the subject matter described in this specification can be embodied in methods that include the actions of identifying, in memory, a plurality of records, each record in the plurality of records identifying at least one map segment in a plurality of map segments included in an interactive electronic map. Each record can further include map usage data corresponding to the identified at least one map segment, the map usage data corresponding to at least one property of at least one presentation of the map segment to a user. Each map segment in the plurality of map segments can be scored. Scoring each map segment can include evaluating map usage data corresponding to the map segment against at least one criteria, the criteria adapted to predict a level of user interest in the map segment based on at least one property of at least one presentation of the map segment. Other embodiments of this aspect include corresponding systems, apparatus, and computer programs, configured to perform the actions of the methods, encoded on computer storage devices.

These and other embodiments can each optionally include one or more of the following features. At least a portion of an electronic interactive map can be presented on a user computing device. Map usage data can be collected during a particular presentation of a particular map segment to a user, the map usage data identifying the particular map segment and at least one property of the particular presentation. At least one property of the presentation can be influenced by a user. At least one property can include at least one of a duration of the presentation, a user interaction with the presentation, a zoom level of the presentation, map view type, and user session data. Map usage data can include a user identifier identifying at least one user to whom the corresponding map segment was presented. Scoring each map segment can include scoring each presentation of each map segment in the plurality of map segments. Interested views of a first map segment can be tracked, wherein an interested view corresponds to presentations of the first map segment scoring above a particular threshold. The tracking of interested views of the first map segment can be used to model interest in a particular geographical location corresponding to the first map segment. At least two shared interested views can be identified that include a first interested view of the first map segment by a first user and a second interested view of the first map segment by a second user. A recommendation can be sent to the first user based on the shared interested views, the recommendation associated with a social networking application.

Further embodiments can each optionally also include one or more of the following features. A set of common map presentations can be identified that were presented to at least one user in the plurality of users, each map presentation in the common map presentations at least including a presentation of at least one common map segment. A particular view of the electronic map can be presented to a user, the particular view including the at least one common map segment, the presentation of the particular view based at least in part on a score of the at least one common map segment. The interactive electronic map can include a plurality of map tiles, each map segment in the plurality of map views corresponding to a particular tile in the plurality of tiles. User preference can be determined for a first map segment in the plurality of map segment, over a second map segment in the plurality of map segments based on a comparison of scores for each of the first and second map segments. A subsequent presentation of the interactive map can be adapted to present the first map segment more prominently than the second map segment based at least in part on the determined user preference for the first map segment. The user preference for the first map segment over the second map segment can correspond to a preference for the first map segment over a particular period of time and the compared scores correspond to presentations of the first and second segments to users during the particular period of time. An association can be identified between at least one map segment in the plurality of map segments and preexisting geographic data associated with a particular geographic location.

Particular embodiments of the subject matter described in this specification can be implemented so as to realize one or more of the following advantages. For example, data and scores describing multiple user interactions with an interactive map can be used to enhance the functionality of the interactive map. Insight can be gained into the popularity of particular geographical locations and features associated with the electronic map based on users' interactions with the map. These insights can, for example, be applied and shared outside the interactive map environment to provide intelligence for use by other applications, including those relating to tourism, real estate, news, and social networking, among others. Additionally, the reliability and quality of the data used to generate an interactive map presentation can be improved, as well as the presentation of the map itself, as it can be more accurately tuned to users' preferences.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 3D illustrates an example of scoring map segments of an interactive electronic map in accordance with the example user interactions illustrated in FIGS. 3A-3C.

Like reference numbers and designations in the various drawings indicate like elements.

DETAILED DESCRIPTION

Interactive, electronic maps can attract millions of users per day. As users interact with an electronic map, various different portions, or segments, of the map can be presented to various users. Users can drag, zoom, and view the map segments in various modes, and perform certain activities by interacting with the map, e.g., charting a route between two locations, obtaining driving directions, or viewing traffic patterns for a particular highway network. In some instances, data can be transmitted to the provider of the electronic map indicating requests corresponding to certain map interactions by the user, e.g., when a user clicks on a toolbar button to zoom-in on a particular set of map segments. These requests and other data can be collected during users' interactions with the map and associated with the particular map segments corresponding to the user interactions. This map usage data can then be analyzed. Analysis of map usage data can include scoring the data to determine the relative popularity of certain map segments in the map. By predicting the user popularity or interest in particular map segments, as well as the popularity of map segments in certain contexts, the presentation and functionality of the interactive map can be enhanced, which can result in better overall user experience with the map.

Figure 1:
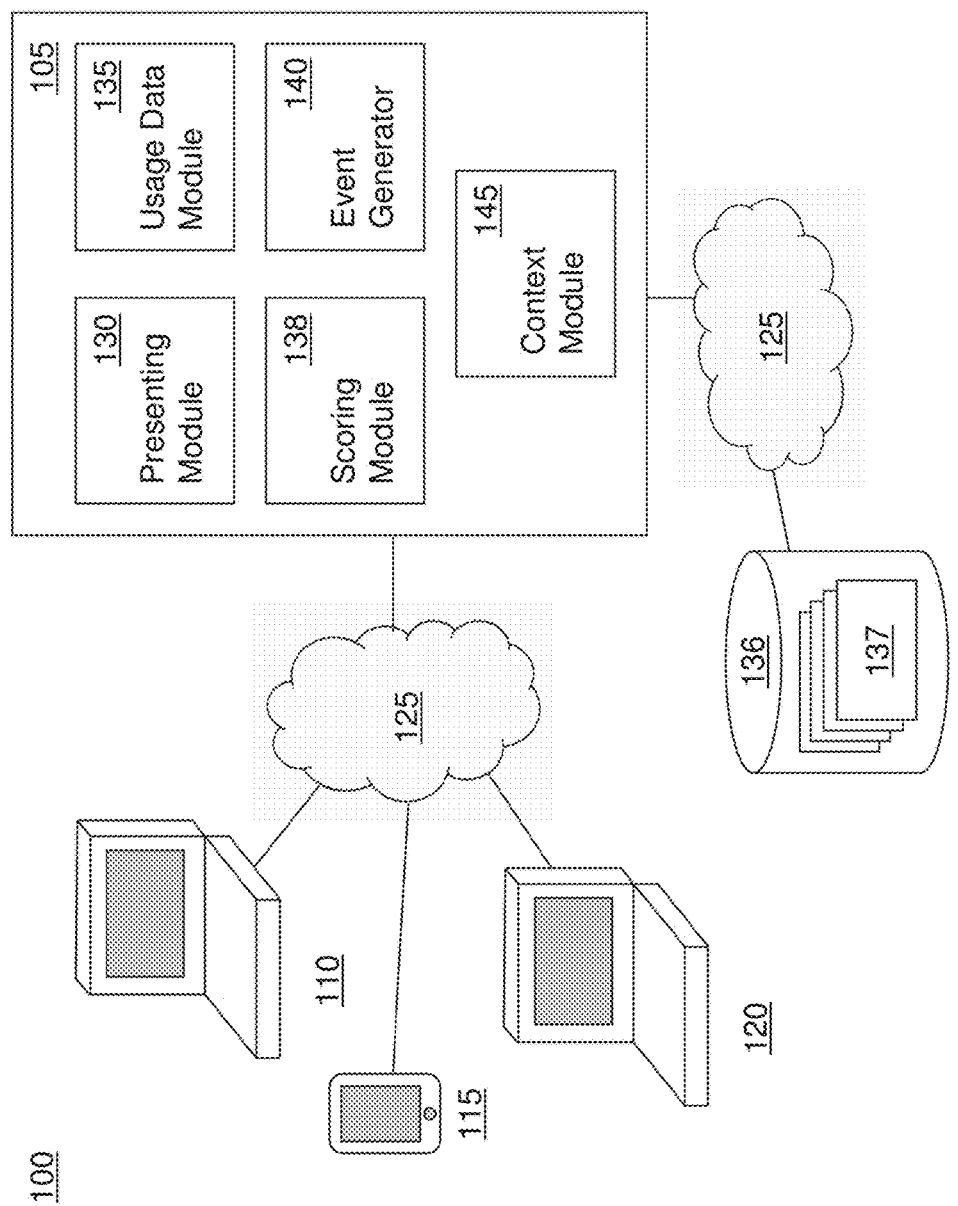
FIG. 1 illustrates a schematic diagram of an example interactive map system adapted to analyze usage of an interactive electronic map.

FIG. 1 illustrates a schematic diagram of an example interactive map system 100 adapted to analyze usage of an interactive electronic map. The system 100 can include an interactive map engine 105 implemented on one or more computing devices, including servers, server farms, and computing devices in a cloud computing environment. The interactive map engine 105 can serve interactive, electronic maps to one or more client devices (e.g., 110, 115, 120) communicatively coupled to the interactive map engine 105 over one or more networks 125. In some instances, actions described as being performed by a user can alternatively be performed by a client or client device, and vice versa. As examples, client devices 110, 115, 120 can include personal computing devices, such as desktop, laptop, tablet, and handheld personal computers, as well as smart phone devices. In some instances, client devices can also include application servers, proxy server devices, and mainframe computing devices that route all or part of a served interactive electronic map to other computing devices or terminals.

An interactive map engine 105 can include one or more modules implemented on one or more computing devices, including back-end server devices, the modules adapted to generate an electronic map for presentation on a client computing device. An interactive map can correspond to a real-world geographical location, area, or region. A user can interface with an interactive map, presented to the user on a GUI, to navigate the map, zoom-in or -out on a section of the map, toggle between various map view types (such as satellite, topographical, street map views), submit queries related to the map, and perform other operations or interactions with a section of the map. The presentation of the map and related visual effects that can be implemented with the map, e.g., in response to user's interactions, can be generated by a map presentation module 130.

In some instances, an interactive electronic map can be made up of a plurality of map segments. In one example, an electronic map can include a plurality of map tiles, e.g., rectangular, hexagonal, or octagonal tiles, stitched together to form a unitary map. Different map zoom levels can include different segment sizes (e.g., a map view of a large area can use larger segments than a map view of a smaller area), or the segment sizes can be independent of the zoom level. In some instances, only a portion of the map, or a portion of the map's segments, can be displayed to a user at a particular time. In some examples, the user can scroll or pan across the map to view various sections of the interactive map. Data can be received by the interactive map engine 105 relating to users' interactions with the map or presentation of the map itself. For instance, as a user interacts with the map, a request can be sent to the interactive map engine 105 to adjust the presentation of the map in accordance with the user's interactions. This data can be collected or logged by a usage data module 135 and stored in a memory device 136. The memory device can include one or more indices, databases, data logs, or other data structures 137 adapted to store and catalog usage data. For instance, usage data can include identification of one or more map segments displayed to a particular user, the time and date the map segments were displayed, the identification of the particular user, the zoom level at which map segments were displayed, the map view type that was presented (e.g., street view, street map, satellite view, etc.), user session data (e.g., search terms used to retrieve the map or searches performed before or after viewing the map), event data pertaining to a particular action or enhancement of the map requested by the user (e.g., display of an overlay of traffic patterns onto a map, printing or saving of a particular map display, etc.), and/or other data relating to a particular map segment presentation and a user's use of and interaction with the presented map segments. In addition, the usage data module can generate additional usage data. For example, data can be generated from time stamp data relating to a user's map presentation requests to determine the duration of time a particular map segment was viewed by, or in the field of view of a user. In another example, usage data can be generated identifying whether the same or different users have previously viewed a particular map segment, how often the map segment is viewed, and the average duration between views. Usage data can be indexed to a particular map segment and/or to a particular user.

In some embodiments, usage data can be collected in accordance with certain predefined rules. For instance, usage data module 135 can include functionality allowing users to opt-out of having data collected by the usage data module 135. For instance, users can opt-out of having all data collected relating to their individual usage of a particular electronic map. In other instances, the collected usage data can exclude data that specifically or inherently identifies a user, in accordance with an opt-in or opt-out request. Other conditions can also be utilized for determining when and what type of map usage data is to be collected.

An interactive map engine 105 can also include a scoring module 138 adapted to score particular map segments and/or particular user views of particular map segments. The scores can be based on usage data collected by the usage data module 135. Scoring can be performed by the scoring module dynamically, in real time, as well as offline or by back-end processes. For example, data memorializing particular map segment views by users (e.g., usage data) can be stored and then scored according to particular criteria by one or more back-end processes managed or provided by the scoring module. In some instances, pre-existing scores can be updated, in some cases in real time, based on a user's immediate views of related map segments. In some examples, a set of criteria or metrics can be used to score particular usage data associated with a map segment to determine a probable or relative level of user interest in the map segment. For instance, map segments with usage data indicating that users spent a relatively long period viewing the map segment, can be given a higher score than other map segments whose usage data suggests that users generally skimmed or skipped past the map segment. Similarly, map segments with usage data indicating that users viewed the map segment at a relatively detailed zoom level (e.g., a street or neighborhood level), can be given a higher score than other map segments having usage data suggesting that users viewed the map segment at a wider zoom level (e.g., a city or regional level). Scores can be based on usage data collected based on one or more users' interactions with a map segment. For instance, scores can be based on an aggregation of the usage data collected based on views of the map segment by a multiple users. In other instances, a score can be generated for a particular user or group of users, based on map usage data of the particular user or group. In some instances, user interaction models can be developed based on the usage data and scores generated based on the usage data. A usage model, for instance, can characterize a usage trend of one or more map segments, including users' views of and interactions with a particular map segment within certain contexts. The models can be used, for example, by the interactive map engine 105 to affect map presentations generated by the interactive map engine 105.

Events, or applications of map usage data by the interactive map engine, can be generated by an event generator 140 based on a score or model determined for a map segment. An "event" can include uses of scored map segments and map usage data to affect or supplement future presentations of the interactive map. Events can also include functionality, applications, and services outside of or supplemental to the presentations of the interactive map that make use of map usage data and scored map segments. For instance, future presentations of a map segment can be tailored based on the score of the map segment. In some instances, multiple map segments can be presented to a user at one time. The relative scores of the map segments in a view of a map presented to a user can affect how the map segments are displayed, for instance, the view of the map can be centered on the map segment(s) with the highest scores in a particular view. The interactive map engine 105 can further include a context module 145 adapted to identify a context of a user's interaction with the electronic map, or map segments in the map. Events and scores generated for a particular map segment can be further based on the context of a user interaction with the map segment. The context can identify how a user arrived at, opened, launched, or browsed to an interactive electronic map. The context can relate to a search query entered by a user that is determined to have some relevance to one or more map segments. The date or time of day of a user interaction can also be used as context for a map event. Further, the type of browser, application, or computing device can also be considered as context. For example, it can be identified whether a user is viewing map data using a portable or handheld computing device (such as a smart phone or tablet computer) or a more traditional, stationary device (e.g., a personal computer), as map views by users of portable computing devices may tend to pertain to attempts by users to find information about a location according to a more immediate need or visit to the corresponding location (e.g., a user using a map presentation on a portable device to find his or her immediate location). Additionally, identification of the user or tendencies of a user can also be used as context, among other examples.

To illustrate, in one example, one or more map segments may correspond to locations in Austin, Tex. that are popular during the renowned Austin City Limits music festival (e.g., music venues, restaurants, bars, hotels, and night clubs). Map usage data pertaining to these map segments may be identified that show the user views of the map segments spike during the weeks leading up to and including the Austin City Limits festival. Accordingly, user views during this period may have been scored higher during this period than other periods in the year. Accordingly, the context module 145 can identify a user submitting a search query relating to "Austin" or "Austin City Limits," or a user browsing map segments of an interactive map near Austin, and identify these actions as related to the highly-scored map segments relating to Austin City Limits. In response, an event generator 140 can generate one or more events that highlight, link to, or present views of these map segments to the user associated with the identified context.

Figure 2:
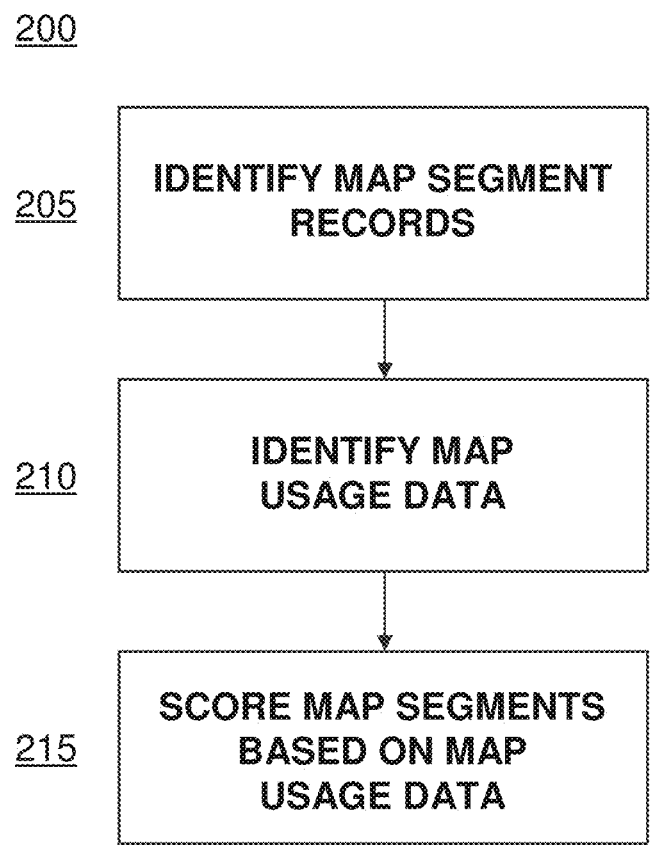
FIG. 2 is a flow diagram illustrating an example technique for analyzing usage of an interactive electronic map.

FIG. 2 is a flow diagram 200 illustrating an example technique for analyzing usage of an interactive electronic map. A plurality of map segment records can be identified 205. Each record can be defined in memory (e.g., in a database) and can identify at least one map segment included in a plurality of map segments making up an interactive electronic map. Map usage data can be stored in each record and identified 210. Map usage data can correspond to properties of presentations of the map segment to users of the interactive electronic map. Properties of a presentation of a map segment can include the duration of a map segment's display, a particular user interaction with the map segment, the resolution or zoom level at which the map segment was displayed, as well as other properties, characteristics, and context of a map segment's display to a user. Each map segment can be scored 215. Scoring map segments can include evaluating map usage data corresponding to the map segment against one or more criteria. The criteria can be adapted to predict a level of user interest in the map segment based on at least one property of at least one presentation of the map segment. For instance, criteria can include scoring a map segment viewed for longer durations, at higher zoom levels, subject to more extensive user interaction, etc. as likely being more interesting, relevant, or popular to a particular user, group of users, or users of the interactive map generally or in a particular context.

A wide array of map usage data and criteria can be used to capture various aspects and properties of a map's presentation to a user. For instance, user-specific data can be identified and collected, including user IDs associated with presentations of a given map segment, user preferences (e.g., hometown, registered interests, demographic data, etc.) of the associated user. Session data indicating recent browser or map interaction activity by the user or search terms used to retrieve one or more map segments can also be identified and collected. Session data can be useful in providing context for a particular user's interactions with a map. For instance, session data can indicate what other searches were conducted or web resources accessed contemporaneously with the user's viewing of particular map segments. Use patterns can be identified from such map usage data to develop associations between particular map segments and other non-map or non-geographical content and subject matter, such as current events, people, activities, and other locations associated with the map segments. The type of user device accessing the map can also be considered. For instance, it can be identified that the presentation of certain map segments were made to a mobile computing device (e.g., a smart phone). Usage patterns and scoring methodologies can use this data to reach certain conclusions regarding user's viewings of particular map segments. The map's functionality can also expand the array of map usage data that can be collected. For instance, interactive maps that provide direction searching or routing between two locations can collect and score data relating to users' use of this and other functionality provided by the map. Other map presentation properties can also be considered and usage data collected, including but not limited to those described elsewhere in this specification.

Figure 3A:
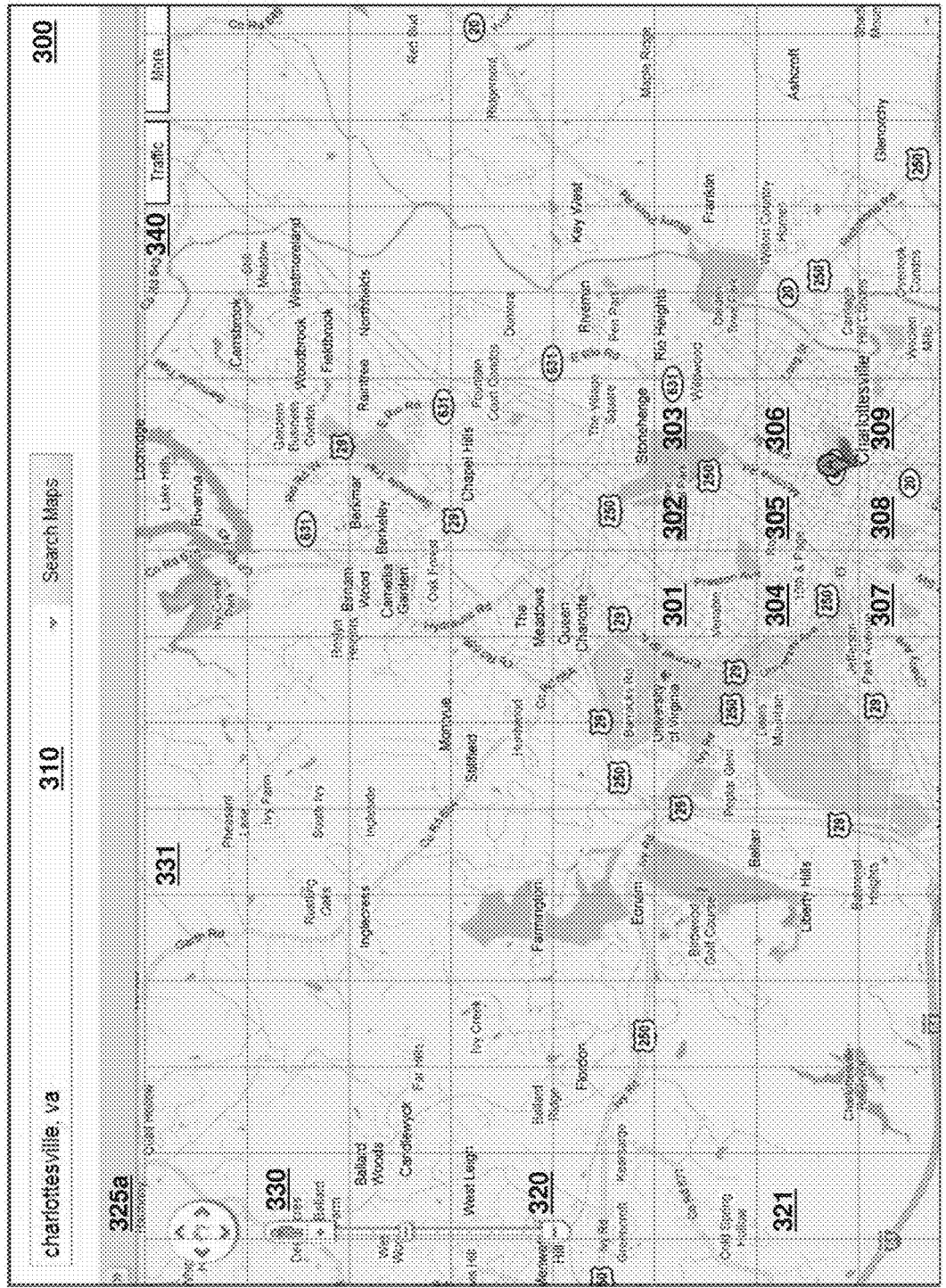
FIGS. 3A-3C illustrate example user interactions with an interactive electronic map.
Figure 3B:
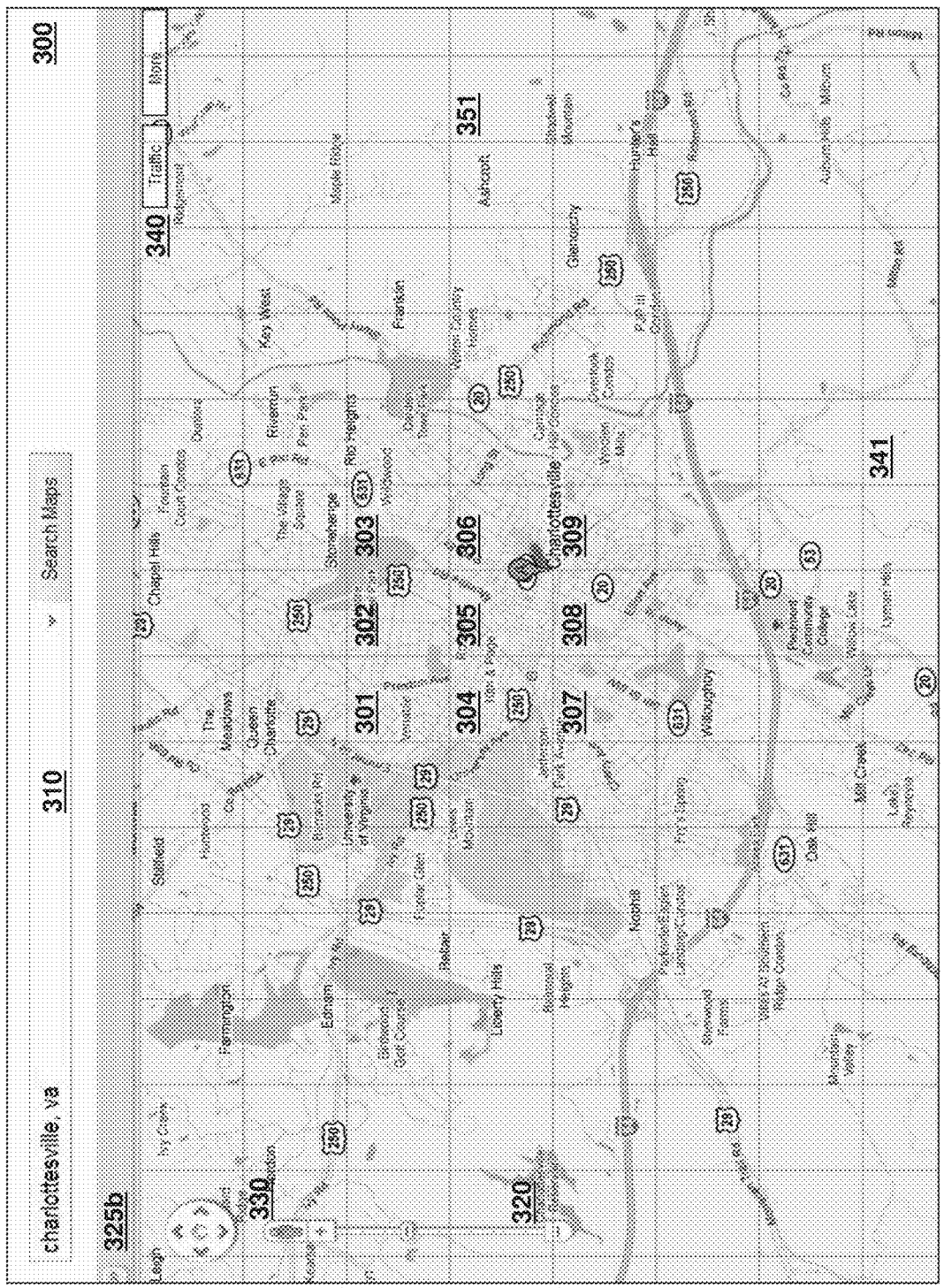
Figure 3C:

FIGS. 3A-3C illustrate example user interactions with an interactive electronic map. As shown in FIG. 3A, a screenshot of an interactive electronic map can display at least a portion of the map to a user at given time. In this particular example, the screenshot shows a view 325a of a map that includes Charlottesville, Va. A user may have scrolled or dragged the interactive map to manipulate the position of the map so as to bring up the view displayed in the screenshot shown in FIG. 3A. As shown in FIG. 3A, the interactive map can include a plurality of map segments (e.g., 301-309, 321, 331) that, in some instances, can be concurrently presented to the user in a particular view 325a of the map. In some examples, a user can be presented with a particular view 325a in response to entering a search query 310 for a particular location.

A user can further interact with a view of a map presented to the user. For instance, the user can further adjust the view of the map to center on, include, or exclude particular sections of the map. As shown in FIG. 3B, a user has interacted with map view 325, shown in FIG. 3A, to better center the view 325b of the map on the city of Charlottesville. As shown in view 325b, however, by interacting and repositioning the map, certain map segments (e.g., 321, 331) are no longer included in the view 325b presented to the user. Some of the map segments (e.g., 301-309) previously presented in view 325a remain in view 325b, while still other map segments (e.g., 341, 351), not presented in view 325a, are presented to the user in view 325b by virtue of the user's repositioning of the map.

In the present example, the interactive electronic map can allow a user to zoom-in or -out on particular portions of the map using, for example, a zoom level control 320. By adjusting the zoom level in or out, a user can view certain map segments, and corresponding geographical details, at a more finite or general level of detail. As shown in FIG. 3C, a user has zoomed-in on the center of view 325b, resulting in the view 325c being presented to the user. As in the example illustrated in view 325b of FIG. 3B, the user's interaction can alter which map segments are presented to the user. In the example of FIG. 3C, all map segments previously presented to the user in views 325a, 325b have been cropped out of view 325c, with the exception of map segments 304-309.

While panning, dragging, launching, or zooming-in and -out on a map view can change, narrow, or widen the set of map segments presented to a user, other user interactions can be monitored that nonetheless do not alter the set of map segments presented. For instance, in the example interactive map illustrated in connection with FIGS. 3A-3C, a user can select a "Traffic" button 340 to display an overlay of traffic patterns on one or more roadways presented in a view of the map. In another example, a user can interact with the map by selecting yet a different view, such as a street view of particular streets (e.g., by selecting a street view control 330) or a satellite view. Other functions, features, controls, and interactions can be made available to a user in certain implementations of an interactive electronic map. In each instance, data relating to map interactions can be captured and collected for use by an interactive map engine.

FIG. 3D illustrates an example of scoring map segments of an interactive electronic map in accordance with the example user interactions illustrated in FIGS. 3A-3C. In accordance with the example interactions and views 325a-c shown and described in FIGS. 3A-3C, map usage data can be collected detailing these interactions as well as how and when certain map segments were displayed to a user. In the example of FIG. 3D, usage data 360 identifying users' interactions with and/or presentation of particular map segments have been collected. The type of usage data collected can vary according to the particular implementation. As illustrated in FIG. 3D, usage data 360 can be collected cataloging the duration 365 a particular map segment was viewable by a particular user at a particular time 370. Additionally, the zoom level 375 and map view type 380, at which the segment was presented, can also be cataloged. From these data points, a level of user interest can be determined or predicted. For instance, map segments that a user elects to have presented for longer periods of time, can be determined to be more likely of interest to the user. Similarly, it can be predicted that map segments viewed at a high zoom level (i.e., closely zoomed-in) or using a particular view type (e.g., satellite image, traffic map, etc.) are likely of greater interest to a user than map segments viewed using a default view type at a lower zoom level. Building upon such assumptions, criteria, metrics, and algorithms can be applied to the usage data to calculate scores that attempt to quantify user interest in particular map segments. In some embodiments, different scores can be calculated for different contexts and/or based on predicted associations with different events.

A wide variety of criteria and algorithms can be applied to develop scores reflecting various trends or contexts. In the simplified example illustrated in FIG. 3D, scores can be determined for each user view of a map segment, based on usage data 360 relating to a user's 00101 viewing of the segment. In this example, usage data 360 by user 00101 corresponds to the user interactions described above in the examples of FIGS. 3A-3C. The user viewed a set of map segments for a brief period at zoom level 5 before zooming-in to zoom level 9. As shown in FIGS. 3A-3C, several map segments (e.g., 304, 307) were included in the map view presented to the user throughout the user's interaction with the map, while other map segments (e.g., 321, 331) were presented only briefly to the user, as the user adjusted the map view to better capture the portion of the map desired by the user. While these briefly-presented map segments were viewed by the user, they were quickly dismissed, resulting in relatively low scores 382 for these briefly-viewed segments. These low scores 382 can correspond to a perceived low level of user interest. Further usage data 361 relates to the zoomed-in view, shown and described in connection with FIG. 3C. As shown in usage data 361, upon zooming-in to the map view shown in FIG. 3C, the user appears to have spent a more prolonged time viewing the presented map segments (e.g., 304-309), resulting in relative high scores for these map segments, both due to the extended duration of the view, as well as the high zoom level of the view. In some examples, the position of the map segments within a particular map view can also be assessed and considered, influencing the score calculated for the map segment during the view. For instance, map segments closer to the center of the view (e.g., segments 301-309 in FIG. 3B) can be scored higher than map segments presented on edges of the view (e.g., segment 341 in FIG. 3B).

Scores 382 can be calculated subsequent to or during collection of the underlying usage data used to tabulate the score 382. Score 382 can be a "session score," scoring usage data corresponding to one or more map views viewed by a particular user (or users) during an identified use or viewing of, or session with, the interactive map. Session scores corresponding to individual viewing instances or sessions by a user (or users) can also be aggregated and/or compared temporally, across users, or across map segments to generate one or more composite scores corresponding to the related map segments, identified geographical locations, the user, or a group of users. For instance, as shown in FIG. 3D, usage data 383, 384 relating to other viewing sessions, including views of maps segments (e.g. 301, 304, 307), can be collected, corresponding to map segment views by different viewers, at different times, and/or under different circumstances. In some instances, future presentations or features of an interactive map can be affected by or based on previously-determined map segment scores. Accordingly, to increase the reliability and statistical meaningfulness of map segment scores, higher map segment scores can be corroborated or determined based on multiple, well-scored views of particular map segments, including multiple views by more than one distinct user. Additionally, temporal trends can be determined, based on temporal spikes in high-scored views of a particular map segment. Further, corroboration of well-scored map views can be accomplished by identifying relationships between real world events, geographical markers, as well as user relationships.

Continuing with the example of FIG. 3D, common, overlapping sets of views can be identified. In one example, views by different users 385 of an overlapping set of map segments (e.g., 304, 307) can be identified, compared, and/or aggregated. As shown, views by user 00102 of map segments 304, 307 were scored higher than views by user 00101, based for instance, on user's 00102 viewing of the same segments in satellite view mode and the longer duration of user's 00102 view. Continuing with the present example, a third user 00103 may have also viewed map segments 304, 307, albeit using yet a different view type i.e., traffic view) and zoom level. In some instances, scoring can use a relative scoring system, where the quality of various views (and corresponding usage data) are first compared, to determine scores comparing the relative significance, or user interest level corresponding to each view. In other instances, overlapping views (e.g., of users 00101, 00102, 00103) can be identified as corroborating views. Corroboration of user-interested views can result in still higher scores being assigned to particular map segments. In still other instances, more specific corroboration between users' map segment views can be identified and used to score the map segments. For instance, it can be identified that a common set of map segment views (i.e., of map segments including 304, 307 by users 00101 and 00102) occurred relatively close in time, potentially making the comparison and/or aggregation of these views and their respective usage data and scores more meaningful. The example of FIGS. 3A-3D is just one example of collecting map usage data and scoring the usage data to determine perceived user interest in corresponding map segments. Many other variations of criteria, usage data, and scoring methodology can also be used.

Figure 4:
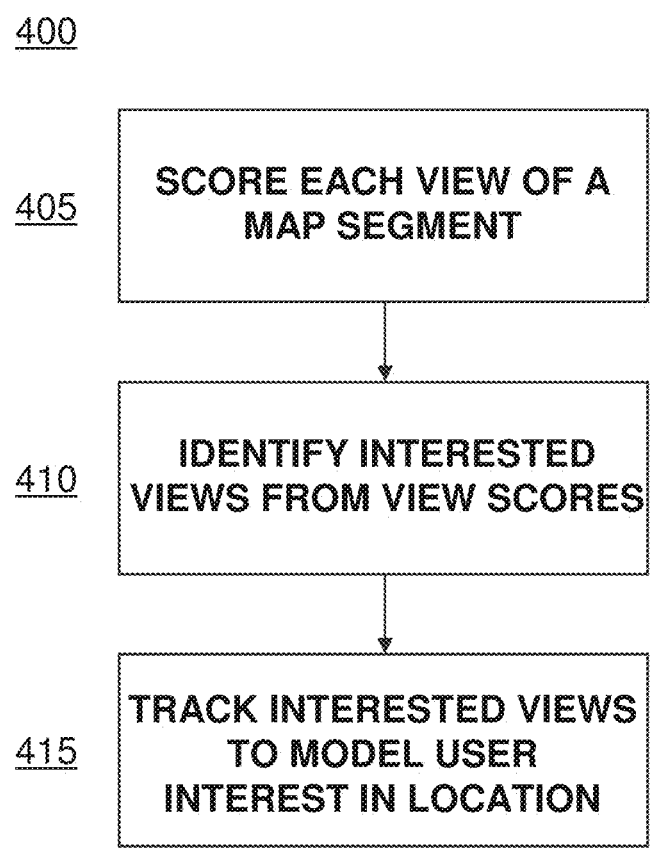
FIG. 4 is a flow diagram illustrating another example technique for analyzing usage of an interactive electronic map.

FIG. 4 is a flow diagram 400 illustrating another example technique for analyzing usage of an interactive electronic map. In addition to maintaining a set of records corresponding to map segments and usage of the map segments, individual user views of or interactions with map segments in an interactive electronic map can be monitored and scored 405. Individual map views can be scored 405 to show user interest in the map segment, for example, based on evaluating data corresponding to a user's interaction with the map segment, or the presentation itself of the map segment to the user. As described in connection with FIG. 2, scores can be based on evaluating map segment usage against criteria adapted to predict user interest based on at least one property of the particular presentation of the map segment to the user. Based on the score of the map view, it can be determined or identified 410 that the view was an "interested" view. In some instances, to qualify as an interested view the score of the view should exceed or otherwise surpass a particular threshold. As an example, the threshold can be a minimum view score. The threshold can be a fixed threshold for a subset or all of the map segments in an interactive map or a relative threshold. For instance, a map view can score above the "interested" threshold by scoring a certain percentage higher than surrounding or nearby map segments. Trends, patterns, and commonalities between interested views can be tracked 415 and used to model user interest in a particular location corresponding to the map segment(s) viewed.

Figure 5:
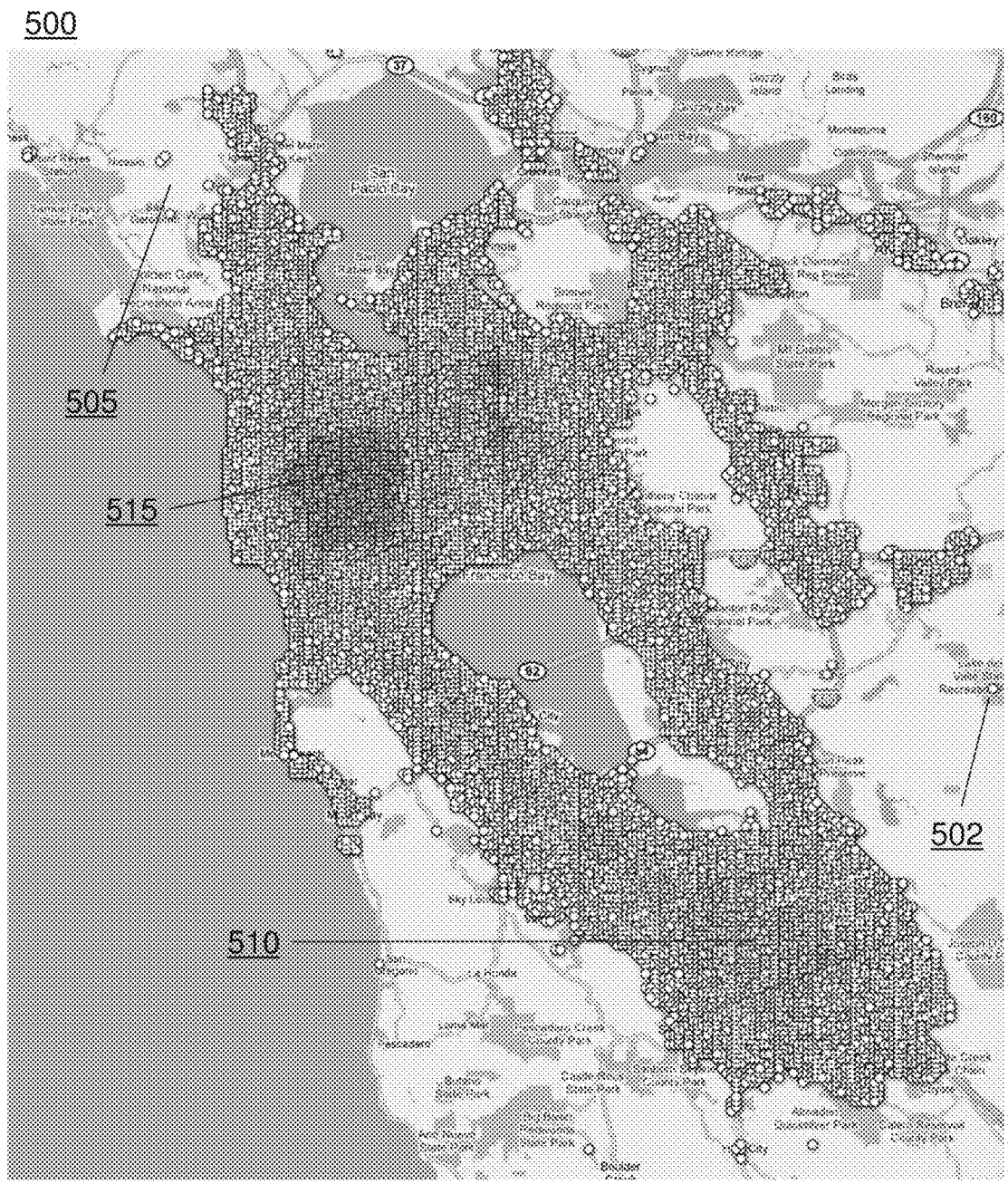
FIG. 5 illustrates one example of an implementation of interactive map usage data in connection with a corresponding map segment.

FIG. 5 illustrates one example of an implementation of interactive map usage data in connection with a corresponding map segment. FIG. 5 shows a section of a map 500 of the Bay Area in Northern California, together with a plurality of data points plotted on the map. Each data point (e.g., 502) can correspond to one or more map segment views determined to have been the subject of a perceivably interested user. The density of interested map segment views for particular map segments is illustrated by the shade of the data point plotted on the map 500. View density is low where no data points are plotted (e.g., 505) or where the data points are shown in white (e.g., 510). More popular map segments, corresponding to a greater number of interest user views, are shown as purple or red data points, with red data points (e.g., 515) having the largest concentration of quality, or interested, user views. In some embodiments, the density data shown in the map 500 is used, for example, to determine which views to present to users. However, in some embodiments, the map 500 can itself be presented to users to serve as an instructional application of usage data collected and scored from a variety of user interactions and views of an interactive electronic map. Additionally, by determining relative popularity of various map segments, or groupings of map segments, additional applications and map events can be realized. For instance, persons interested in or conducting a search relating to tourism in the Bay Area could be directed to particular map views and supplemental content identified as associated with real world geographical locations corresponding to identified "popular" map segments. Users can use usage data to quickly identify popular hotspots or areas of the Bay Area that correspond to multiple, corroborating map views by perceivably interested users. Further, display of the Bay Area, as well as identified popular map segments, can be customized or modified based on the identity of the user (e.g., as defined in user profile data), as well as the time of day or year to further refine presentation of the map to the user.

Figure 6:
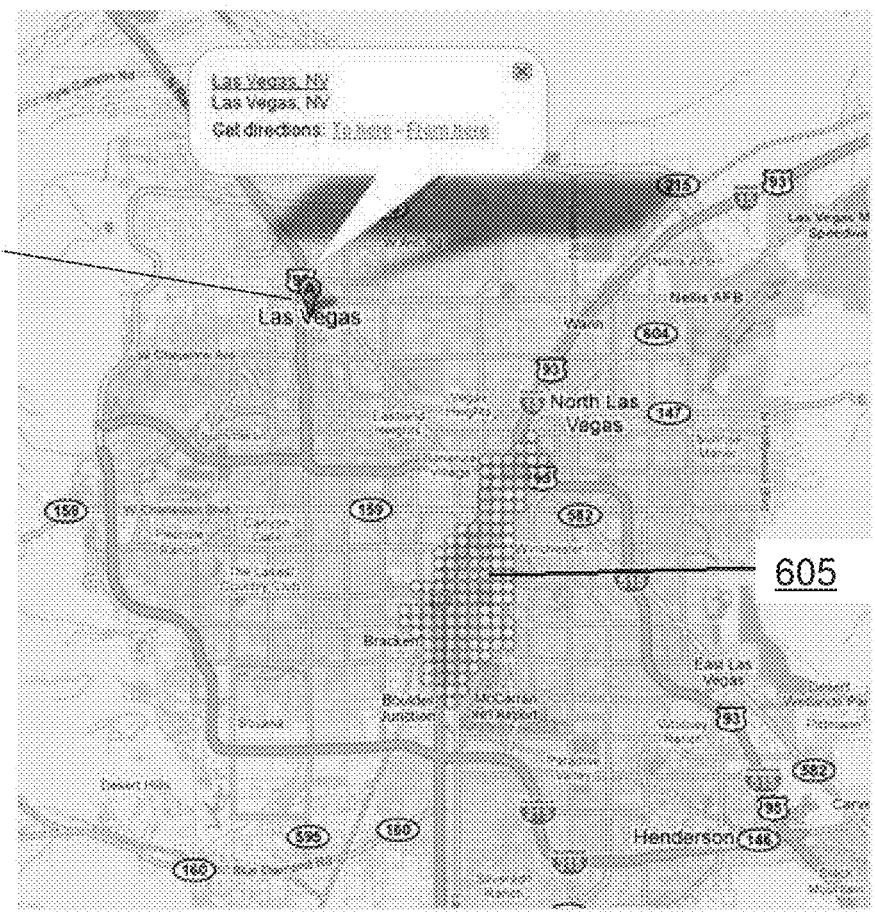
FIG. 6 illustrates another example of an implementation of interactive map usage data in connection with a corresponding map segment.

FIG. 6 illustrates another example of an implementation of interactive map usage data in connection with a corresponding map segment. Similar to FIG. 5, FIG. 6 shows a map 600 with a plurality of data points corresponding to interested map views by users of an interactive, electronic map. In the example of FIG. 6, the map shows Las Vegas, Nev. A high concentration 605 of data points exists in a narrow section of Las Vegas corresponding to the Las Vegas Strip. In some implementations, a user can be directed to, linked to, or otherwise land on a presentation of a particular geographical location by the electronic map. For instance, a user can enter a query for "Las Vegas" and be presented with a default view of the city of Las Vegas. Determining the most appropriate default view can be difficult, and in some instances, based on a subjective guess of which view would interest most users. Rather than relying on guesswork or a rough approximation, a default view of a particular view of a real world geographical location can be based on usage data collected from users' previous views of map segments corresponding to the location. For instance, rather than picking a view that shows and is centered on the geographic center 610 of Las Vegas, a default view can be determined that most prominently presents (e.g., centered on or zoomed-in on) a view of the set 605 of the most popular map segments corresponding to Las Vegas, as determined from map usage data collected and scored for the electronic map.

In the example above, it is taken for granted that particular map segments are identified as associated with a real world location (e.g., Las Vegas), including political, geological, nautical, and nature locations. In practice, implementation of these associations can be more involved. For instance, an interactive map engine may index each of the map segments to nothing more than corresponding longitudinal, latitudinal, and other geographic coordinates and coordinate systems. Mapping a particular segment to a real world location name, event, news story, business location, etc. can require an additional query of databases, catalogs, and dictionaries that include mappings of geographical mark-up data or longitude and latitude information, for instance, to particular location names or events. Such databases and dictionaries can be managed, served, and provided by third parties and hosted in remote computing devices. In other instances, databases and dictionaries of geography data can be implemented in connection with the interactive map engine itself. While these information sources can provide useful information, selections of which map segments to present to users can be further refined based on collected usage data.

Map usage data scored to reflect user interest, relevance, or importance can be used in a variety of ways and in a wide array of applications. As described above, scored map usage data can be used to refine the presentation of corresponding map views, so as to attempt to display a view that is likely of most interest to a user. Usage data can be scored and used in accordance with user preferences. For instance, repeat views of particular map segments can result in a corresponding map view or geographical location being identified as a "favorite" of the user. In other instances, map usage data and map segment scores can be used to assist in disambiguating map- or geography-related search results. For instance, a user may submit a query for "Paris." This could be Paris (France), Paris (Texas), or Paris (New York). To predict the user intention for the search, or to order search results returned for the query, map usage data can be consulted to identify the "Paris" that is the most popular among users, in that it is most often viewed by users of the interactive map system. For example, it can be expected that there will be more, high-scoring user views of Paris, France than of Paris, Tex. or Paris, N.Y., and a listing of search results or disambiguation of the search term can list Paris, France first, or even return a view of a map of Paris, France in the interactive map interface based on a default assumption that the user intended to search for the most popular "Paris," as measured from stored map usage data.

As described above, the context of a user's interactions with an electronic map or with other computer systems can also be used in connection with scored map usage data to generate one or more events, or perform one or more functions. For instance, to return to the example above relating to the disambiguation of a query relating to "Paris," user profile data, browsing history, session data, or IP address can be consulted as context to further predict which "Paris" is most relevant to the user. For instance, a user may have been browsing for hotel deals relating to an overnight stay in Paris, Tex. prior to searching for "Paris" on an interactive map. Accordingly, rather than predicting, for example, that the user would be interested in viewing a map of Paris, France, map usage data relating to map segments associated with Paris, Tex. can instead be consulted to generate a recommended interactive map view of Paris, Tex., based on the context of the user's interaction with the map. Further, the particular view of Paris, Tex. can be customized, based on context, to show portions of Paris, Tex. that other out-of-state map users had viewed, at or around the same period, or season, in this or previous years, to attempt to present map segments of interest to what is assumed to be a potential tourist of Paris, Tex. (e.g., based on the user's previous hotel search).

Context data and map usage data can also be used to generate recommended map views associated with non-geographic searches. For instance, a user may submit a search query for "field of dreams." An event generator, in conjunction with a context module and scoring module, can identify map usage data of previous users showing that other users, with browsing histories or session data that included web page views or searches relating to the film Field of Dreams, often viewed map segments corresponding to Dyersville, Iowa, where the movie was filmed. Accordingly, based on this usage data, scores suggesting that particular map segments are most relevant, and context data including the present search for "field of dreams," a view incorporating the popular segments of Dyersville, Iowa (e.g., a corn field housing a baseball diamond) might also be recommended to the user in response to the "field of dreams" search. Other non-geographic searches can also be implemented and relate, for example, to real world news events, people, real estate listings, sports and entertainment schedules, and so on. Additionally, context, session, and map usage data can also be used in reverse, where news events, persons, points of interest, etc. identified as related to particular map segments, can be identified for a user dynamically in response to the presentation of related map segments. To continue with the Dyersville, Iowa example, a user can scroll to a portion of an interactive map that includes display of map segments corresponding to Dyersville, Iowa. Based on previous user's views of these map segments, as well as session data and context data associating the film Field of Dreams to these particular map segments, a user's viewing of the Dyersville, Iowa map segments can automatically trigger presentation of supplemental material to the user, including hyperlinks to other resources, identifying Field of Dreams-related web pages, information, and other resources.

Map-related events generated based on map usage data can influence how a map is displayed to a user, influence the operation of other non-map applications, as well as influence the presentation of other information, such as links, map overlays, video, sound, games, and other media identified as potentially interesting or useful to a user based on scored map usage data. As an example, an application adapted to predict market or customer trends can use scored map usage data, or trends identified using scored map usage data, in connection with reports or services provided by the application. For instance, a real estate application can use map usage data to reach certain conclusions regarding the popularity of neighborhoods or properties listed for lease or sale. A particular listed property can be located in a region represented by one or more map segments. Map usage data can exist for these particular map segments corresponding to the listed property. Accordingly, a real estate program can provide feedback to an investor, broker, or real estate agent predicting user interest in a property based on the number and quality of views of and interactions with map segments related to the property. In another example, tourism trends can be predicted and provided in connection with an application that shows time-varying interest or popularity in one or more tourism markets. As users will sometimes "scout" the location of a planned vacation via an electronic map prior to booking or leaving for their trip, in some instances future tourist activity can be predicted from map segment views and related usage data. For instance, an application can provide year-over-year comparisons, on a week-by-week basis, for map view "traffic," or popularity, relating to a particular set of map segments corresponding to a particular tourism market or attraction. This can be used to make predictions for coming tourist seasons, based on the year-over-year comparison of map usage data for the segments. For instance, if a higher volume of "interested" views of a corresponding map segment took place in the same month of a previous year, a prediction can be made that upcoming tourist traffic may decrease relative to the previous year. In some instances, presentation of market behavior data can be integrated or otherwise combined with the presentation of an electronic map. For instance, an infographic can be generated using the map to show temporal changes in user interest, such as through an animation or map overlay showing the changes in map view traffic for particular map segments.

Scored map usage data can also be used within the context of social networking applications. As an example, users can be identified that viewed a common set of map segments. The quality (i.e., score) of the users' views can also be considered. Based on this identified common map viewing behavior, a social networking connection, "friendship," or other relationship can be suggested, identifying and introducing each user to the other based on this commonality. In certain instances, user interests can be predicted based on map viewing behavior defined in map usage data. Identified common user interests can also serve as the basis for a social networking connection between two or more users. For instance, users that each repeatedly view satellite map views of golf courses in a certain geographical area can be identified as sharing a common interest in local golf courses. Additionally, users that already share some social networking relationship can be presented with recommendations based on a friend's map views. As an example, a highly-scored map segment view by a first user can be identified corresponding to the location of an upcoming real world event, such as a concert. A map presentation incorporating this highly-scored map segment and/or a presentation of information relating to the corresponding real world event can then be forwarded as a recommendation to a second user identified as sharing a relationship and/or interests with the first user. Looser social networking applications can also make use of scored map usage data. In yet another example, a user of an interactive map may browse to a certain set of map segments. An event engine can identify, from map usage data, that users who view this particular set of map segments often also view other map segments or view the map segments in a particular viewing mode (e.g., satellite). Accordingly, a recommendation can be provided to the user viewing the particular set of map segments recommending these other map views that were popular with other users. In some instances, a recommendation of supplemental or non-map content can also be recommended to a user based on map usage data, such as links to news reports, events, or tourism websites identified as having been viewed or accessed by other users viewing the particular set of map segments.

The applications and usage of scored map usage data are not to be limited to the illustrative examples described above. Indeed, a wide variety of additional and alternative applications, uses, and implementations are within the scope of the subject matter described herein and claimed below. For instance, alternative and supplemental data collection, scoring, and event generation methodologies and types can be applied beyond the example techniques and applications described above.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices), including a distributed software environment or cloud computing environment.

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network. As an example, the computer program and data accessed and stored by program can be implemented in a cloud-based computing environment.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. For instance, in some implementations, a heads-up display (HUD) interface can be used in connection with voice recognition controls, to allow a user to interact and view an interactive map in a "hands-free" environment," such as during operation of a vehicle. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
receiving map usage data indicating interactions of a plurality of users with a plurality of map segments of an electronic map of a geographic area;
scoring, with one or more processors, each of the plurality of map segments using zoom levels selected by the plurality of users at which the plurality of users viewed the map segments to determine respective popularities of the map segments, the zoom levels included in the map usage data, wherein a higher score corresponds to a higher popularity, the scoring including:
identifying the geographic area corresponding to the plurality of map segments within the electronic map;
identifying a particular map segment within the plurality of map segments corresponding to a portion of the geographic area;
assigning a first score to the particular map segment included in the plurality of map segments when the particular map segment is viewed at a first zoom level, and
assigning a second score different from the first score to the same particular map segment when the same particular map segment is viewed at a second zoom level different from the first zoom level;
receiving, from a user interface of a client device, a query for the geographic area,
modifying, with the one or more processors, a view of the electronic map that presents the geographic area based on the scores of map segments in the geographic area, including automatically centering, with one or more processors, the view and selecting a zoom level based on one or more highest scoring map segments of the map segments corresponding to the geographic area; and
sending to the device in response to the query, the view of the electronic map that presents the geographic area, the view centered so as to indicate popularity of the map segments.

2. The method of claim 1, wherein centering the view comprises centering the view on the most popular map segments in the geographic area.

3. The method of claim 1, wherein scoring each of the plurality of map segments further comprises scoring each of the plurality of map segments based on durations of viewings of the map segments by users, the durations included in the map usage data.

4. The method of claim 1, where scoring each of the plurality of map segments further comprises scoring each of the plurality of map segments based on the position of the map segments in the interactive electronic map, the positions included in the map usage data.

5. The method of claim 1, wherein:
scoring each of the plurality of map segments comprises calculating a score for each respective map segment among the plurality of map segments based on durations of time during which the respective map segment was viewed by users as indicated by the map usage data, positions of the respective map segment relative to centers of map views previously presented to users as indicated by the map usage data, zoom levels of the map views previously presented to users as indicated by the map usage data;
the received query identifies a city; and
determining the view of the electronic map that presents the geographic area comprises:
selecting a geographic center of the geographic extent depicted in the electronic map, the geographic center corresponding to a map segment that is the most popular among map segments corresponding to the city, and the selected geographic center being different from a geographic center of the city; and
selecting a zoom level based on the most popular among map segments corresponding to the city.

6. A system comprising:
one or more processors; and
one or more memory devices comprising program instructions that are executable by the one or more processors to cause the one or more processors to perform the steps of:
receiving map usage data indicating interactions of a plurality of users with a plurality of map segments of an electronic map of a geographic area;
scoring, with one or more processors, each of the plurality of map segments using zoom levels selected by the plurality of users at which the plurality of users viewed the map segments to determine respective popularities of the map segments, the zoom levels included in the map usage data, wherein a higher score corresponds to a higher popularity, the scoring including:
identifying the geographic area corresponding to the plurality of map segments within the electronic map;
identifying a particular map segment within the plurality of map segments corresponding to a portion of the geographic area;

assigning a first score to the particular map segment included in the plurality of map segments when the particular map segment is viewed at a first zoom level, and assigning a second score different from the first score to the same particular map segment when the same particular map segment is viewed at a second zoom level different from the first zoom level;

receiving, from a user interface of a client device, a query for the geographic area;

modifying a view of the electronic map that presents the geographic area based on the scores of map segments in the geographic area, including automatically centering the view and selecting a zoom level based on one or more highest scoring map segments of the map segments corresponding to the geographic area; and sending, to the device in response to the query, the view of the electronic map that presents the geographic area, the view centered so as to indicate popularity of the map segments.

7. The system of claim 6, wherein centering the view comprises centering the view on the most popular map segments in the geographic area.

8. The system of claim 6, wherein scoring each of the plurality of map segments further comprises scoring each of the plurality of map segments based on durations of viewings of the map segments by users, the durations included in the map usage data.

9. The system of claim 6, where scoring each of the plurality of map segments further comprises scoring each of the plurality of map segments based on the position of the map segments in the interactive electronic map, the positions included in the map usage data.

10. The system of claim 6, wherein:
scoring each of the plurality of map segments comprises calculating a score for each respective map segment among the plurality of map segments based on durations of time during which the respective map segment was viewed by users as indicated by the map usage data, positions of the respective map segment relative to centers of map views previously presented to users as indicated by the map usage data, zoom levels of the map views previously presented to users as indicated by the map usage data;
the received query identifies a city; and
determining the view of the electronic map that presents the geographic area comprises:
selecting a geographic center of the geographic extent depicted in the electronic map, the geographic center corresponding to a map segment that is the most popular among map segments corresponding to the city, and the selected geographic center being different from a geographic center of the city; and
selecting a zoom level based on the most popular among map segments corresponding to the city.

11. A non-transitory computer readable storage medium comprising program instruction stored thereon that are executable by one or more processors to cause the one or more processors to perform the steps of:
receiving map usage data indicating interactions of a plurality of users with a plurality of map segments of an electronic map of a geographic area;
scoring, with one or more processors, each of the plurality of map segments using zoom levels selected by the plurality of users at which the plurality of users viewed the map segments to determine respective popularities of the map segments, the zoom levels included in the map usage data, wherein a higher score corresponds to a higher popularity, the scoring including:
identifying the geographic area corresponding to the plurality of map segments within the electronic map;
identifying a particular map segment within the plurality of map segments corresponding to a portion of the geographic area;
assigning a first score to the particular map segment included in the plurality of map segments when the particular map segment is viewed at a first zoom level, and
assigning a second score different from the first score to the same particular map segment when the same particular map segment is viewed at a second zoom level different from the first zoom level;
receiving, from a user interface of a client device, a query for the geographic area;
modifying a view of the electronic map that presents the geographic area based on the scores of map segments in the geographic area, including automatically centering, with one or more processors, the view and selecting a zoom level based on one or more highest scoring map segments of the map segments corresponding to the geographic area; and
serving, to the device in response to the query, the view of the electronic map that presents the geographic area for display on the device, the view centered so as to indicate popularity of the map segments.

12. The medium of claim 11, wherein centering the view comprises centering the view on the most popular map segments in the geographic area.

13. The medium of claim 11, wherein scoring each of the plurality of map segments further comprises scoring each of the plurality of map segments based on durations of viewings of the map segments by users, the durations included in the map usage data.

14. The medium of claim 11, wherein identifying a geographic area of interest based on popularities of the plurality of map segments comprises identifying one or more map segments having a high score relative to other map segments of the interactive electronic map.

15. The medium of claim 11, wherein:
scoring each of the plurality of map segments comprises calculating a score for each respective map segment among the plurality of map segments based on durations of time during which the respective map segment was viewed by users as indicated by the map usage data, positions of the respective map segment relative to centers of map views previously presented to users as indicated by the map usage data, zoom levels of the map views previously presented to users as indicated by the map usage data;
the received query identifies a city; and
determining a view of the electronic map that presents the geographic area comprises:
selecting a geographic center of the geographic extent depicted in the electronic map, the geographic center corresponding to a map segment that is the most popular among map segments corresponding to the city, and the selected geographic center being different from a geographic center of the city; and
selecting a zoom level based on the most popular among map segments corresponding to the city.

16. The method of claim 1, wherein the received user query does not specify a center of the view of the geographic area.

17. The method of claim 1, wherein automatically centering the view based on the scores of the map segments includes determining a center of the view different from a geographic center of the geographic area.

18. The method of claim 1, wherein map usage data is received for a plurality of geographic areas, the query is ambiguous as to which one of the plurality of geographic areas the query relates, and the method further comprises:
   determining, with the one or more processors, the one of the plurality of geographic areas to present by combining the scores of each of the plurality of map segments for each of the plurality of geographic areas and comparing a combined score for each of the plurality of geographic areas to determine a highest scoring geographic area.

* * * * *